No. 634,868. Patented Oct. 17, 1899.
G. L. BENSON.
REFRIGERATOR CASE.
(Application filed Mar. 29, 1899.)
(No Model.)

Witnesses
Clarence N. Walker.
J. F. Riley

George L. Benson  Inventor
By his Attorneys,
C. A. Snow & Co.

THE NORRIS PETERS CO., PHOTO-LITHO., WASHINGTON, D. C.

UNITED STATES PATENT OFFICE.

GEORGE L. BENSON, OF ST. MICHAELS, MARYLAND.

REFRIGERATOR-CASE.

SPECIFICATION forming part of Letters Patent No. 634,868, dated October 17, 1899.

Application filed March 29, 1899. Serial No. 710,938. (No model.)

*To all whom it may concern:*

Be it known that I, GEORGE L. BENSON, a citizen of the United States, residing at St. Michaels, in the county of Talbot and State of Maryland, have invented a new and useful Refrigerator-Case, of which the following is a specification.

The invention relates to improvements in refrigerator-cases.

The object of the present invention is to improve the construction of shipping-cases and to provide a simple, inexpensive, and efficient refrigerator-case adapted for shipping perishable goods and capable of containing a sufficient quantity of ice and of subjecting the contents of the case to the full effect of the said ice.

The invention consists in the construction and novel combination and arrangement of parts hereinafter fully described, illustrated in the accompanying drawings, and pointed out in the claims hereto appended.

Figure 1:
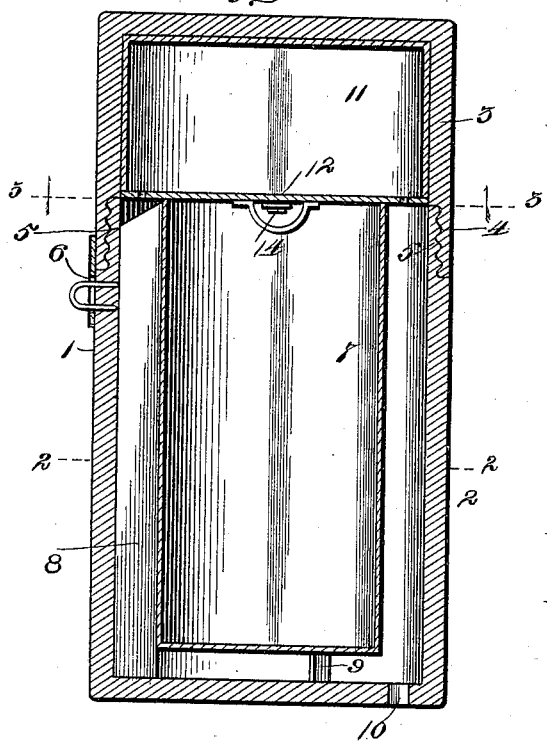
Figure 4:
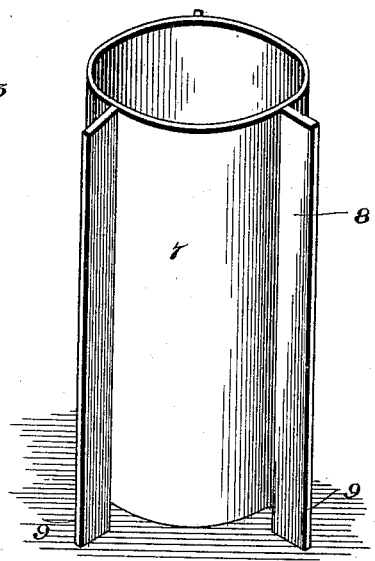
Figure 2:
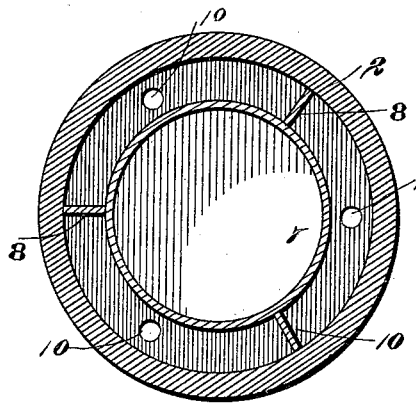
Figure 5:
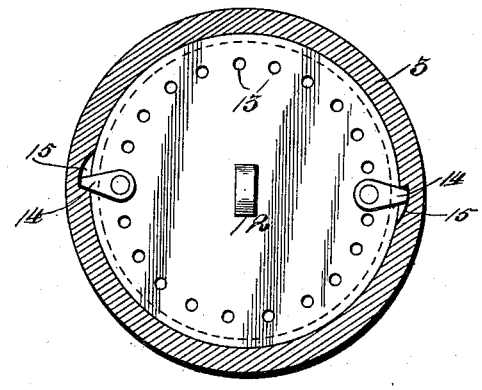

In the drawings, Figure 1 is a vertical sectional view of a refrigerator-case constructed in accordance with this invention. Fig. 2 is a horizontal sectional view on line 2 2 of Fig. 1. Fig. 3 is a similar view on line 3 3 of Fig. 1. Fig. 4 is a perspective view of the inner receptacle.

Like numerals of reference designate corresponding parts in all the figures of the drawings.

1 designates an outer case, composed of a body portion 2 and a removable cover 3, preferably interiorly threaded at 4 to screw on a reduced threaded portion 5 of the body 2, and the said cover is secured on the body by a fastening device 6, consisting of a hasp and staple, but any other suitable means may be employed. Within the body of the case is arranged an inner receptacle 7, preferably consisting of a can and designed to contain the goods to be shipped, and this inner receptacle is provided on its exterior with longitudinal bars or flanges 8, disposed vertically and spacing the receptacle 7 from the outer case to form an annular space. The bars or flanges have their lower ends 9 extended below the bottom of the inner vessel to support the same above the bottom of the case, which is provided with a series of drain-openings 10 for the escape of water resulting from the melting of ice.

The cover or upper section of the case is sufficiently deep to form a receptacle for ice, and it is provided above the screw-threads 4 with a box 11, forming a lining and adapted for the reception of ice. The box 11, which is preferably cylindrical, like the case, although the latter may be of any other desired configuration, is inverted when the upper section or cover 3 is in position, and it is provided with a horizontal lid or diaphragm 12, interposed between it and the inner receptacle and forming a cover for both the box and the receptacle 7. The lid or diaphragm, which has a suitable handle, is provided with an annular series of perforations 13, and it has pivoted buttons 14 located at diametrically opposite points and adapted to engage interior recesses 15 of the upper section or cover of the case, whereby the lid or diaphragm is securely retained on the box. The ice is placed in the box when the upper section or cover 3 is inverted and the lid or diaphragm is then secured in position. The upper section or cover 3 is then placed on the case, and the warm air ascending the annular air-space surrounding the inner receptacle will be cooled by contact with the ice, and the water resulting from the melting of the same will escape through the perforations 13 and will pass down the annular space between the inner receptacle and the outer case and escape through the drain-openings. By this arrangement the inner case will be kept perfectly cool as long as there is any ice in the box and the contents of the inner receptacle are subjected to the full effect of the ice.

The invention has the following advantages: The shipping-case, which is simple and comparatively inexpensive in construction, forms an efficient refrigerator, and the ice is arranged at the top, where it will operate to the greatest advantage. The water is caused to escape from the case at the bottom thereof and serves to cool the air as it flows through the intervening space between the inner receptacle and the outer case. The device is easily supplied with ice, and the cover of the ice-box also serves as the cover of the inner receptacle, which contains the goods being shipped. The vertical bars or flanges, which are arranged on the exterior of the inner receptacle, extend below the bottom of the same and form feet for supporting the same above the bottom of the case.

Changes in the form, proportion, size, and the minor details of construction within the scope of the appended claims may be resorted to without departing from the spirit or sacrificing any of the advantages of this invention.

What is claimed is—

1. In a refrigerator-case, the combination with a body and a covering adapted for threaded engagement therewith, of an inner receptacle within the body and reaching to the upper edge thereof, an ice-receptacle in the cover, and a lid for the ice-receptacle and adapted to be seated upon the inner receptacle when the cover is screwed into place, said lid having means for holding it upon the ice-receptacle during the screwing operation.

2. A refrigerator-case comprising a body portion having an opening in its bottom, an inner receptacle having radial flanges extending below the under side thereof and adapted to rest upon the bottom of the body portion, a cover adapted for threaded engagement with the body, an ice-receptacle in the cover, a lid for the ice-receptacle having communicating openings leading from the ice-receptacle between the body and inner receptacle, and means for holding the lid in position upon the ice-receptacle, said lid being adapted for compression upon the inner receptacle when the cover is screwed into place.

3. A device of the class described comprising a body portion and a cover adapted for threaded engagement, an ice-box arranged within and forming a lining for the cover, a lid for the ice-box having means for holding it in position, an inner vessel within the body portion and separated from the walls thereof by an interspace, openings in the lid leading to said interspace, and radial flanges adapted to hold the inner receptacle in position, said inner receptacle projecting to the top of the body portion to receive the lid of the ice-box when the cover is screwed into place.

In testimony that I claim the foregoing as my own I have hereto affixed my signature in the presence of two witnesses.

GEO. L. BENSON.

Witnesses:
  JOHN H. SIGGERS,
  L. WIESER.